(12) United States Patent
Maymon et al.

(10) Patent No.: US 9,484,748 B2
(45) Date of Patent: Nov. 1, 2016

(54) DUAL PORT PASS-THROUGH MIDSPAN

(71) Applicant: Microsemi Corp.—Analog Mixed Signal Group Ltd., Hod Hasharon (IL)

(72) Inventors: Beny Maymon, Holon (IL); Shlomo Elbaz, Hod Hasharon (IL)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 528 days.

(21) Appl. No.: 14/010,708

(22) Filed: Aug. 27, 2013

(65) Prior Publication Data

US 2014/0103707 A1   Apr. 17, 2014

Related U.S. Application Data

(60) Provisional application No. 61/712,623, filed on Oct. 11, 2012.

(51) Int. Cl.
*H02J 3/02* (2006.01)
*H04B 3/54* (2006.01)
*H02J 4/00* (2006.01)
*G06F 1/26* (2006.01)
(Continued)

(52) U.S. Cl.
CPC . *H02J 4/00* (2013.01); *G06F 1/26* (2013.01); *H04L 12/10* (2013.01); *G06F 1/00* (2013.01)

(58) Field of Classification Search
CPC .............. H04L 12/10; H02J 3/02; H02J 3/14; H04B 3/23; H04B 3/46; H04B 3/32
USPC ........... 307/2, 43, 39, 80, 82, 10.1; 370/401, 370/400; 713/400, 320; 455/402, 572
See application file for complete search history.

(56) References Cited

U.S. PATENT DOCUMENTS 6,473,608 B1   10/2002   Lehr
7,851,938 B2 * 12/2010   Diab ................... H02J 13/0062
                                                         307/2
7,971,075 B2    6/2011   Diab
(Continued)

FOREIGN PATENT DOCUMENTS

WO     2011151773 A1    12/2011

OTHER PUBLICATIONS

IEEE Std 802.3af—2003, Jun. 18, 2013, pp. 29-57, 94-96, 102, 115; published by IEEE, New York, NY.
(Continued)

*Primary Examiner* — Jagdeep Dhillon
(74) *Attorney, Agent, or Firm* — Simon Kahn

(57) ABSTRACT

A dual port pass through midspan constituted of: a first port arranged for connection to a first data terminal equipment over a first data communication cabling; a second port arranged for connection to a second data terminal equipment over a second data communication cabling; a first power sourcing equipment arranged to inject power on two of the 4 wire pairs of the first data communication cabling; a second power sourcing equipment arranged to inject power on two of the 4 wire pairs of the second data communication cabling; and a data pass through connection arranged to pass high speed data signals between the first port to the second port, the data pass through connection comprising a direct current blocking circuit arranged to: prevent power from the first power sourcing equipment from appearing at the second port; and prevent power from the second power sourcing equipment from appearing at the first port.

15 Claims, 3 Drawing Sheets

(51) Int. Cl.
*H04L 12/10* (2006.01)
*G06F 1/00* (2006.01)

(56) References Cited

U.S. PATENT DOCUMENTS

| | | | | |
|---|---|---|---|---|
| 8,300,666 B2* | 10/2012 | Karam | ................ | H02J 13/0048 307/28 |
| 2005/0195583 A1 | 9/2005 | AbuGhazaleh | | |
| 2007/0021094 A1 | 1/2007 | Elkayam | | |
| 2007/0278857 A1* | 12/2007 | Robbins | .................... | H02J 1/10 307/2 |
| 2007/0288771 A1* | 12/2007 | Robbins | ................. | H04L 12/10 713/300 |
| 2010/0115299 A1* | 5/2010 | Darshan | ................. | G06F 1/266 713/300 |
| 2011/0241425 A1* | 10/2011 | Hunter, Jr. | .............. | H04L 12/10 307/39 |
| 2013/0339760 A1* | 12/2013 | Zimmerman | ............. | G06F 1/26 713/300 |

OTHER PUBLICATIONS

IEEE Std 802.3at—Oct. 30, 2009, pp. 22-67, published by IEEE, New York, NY.

* cited by examiner

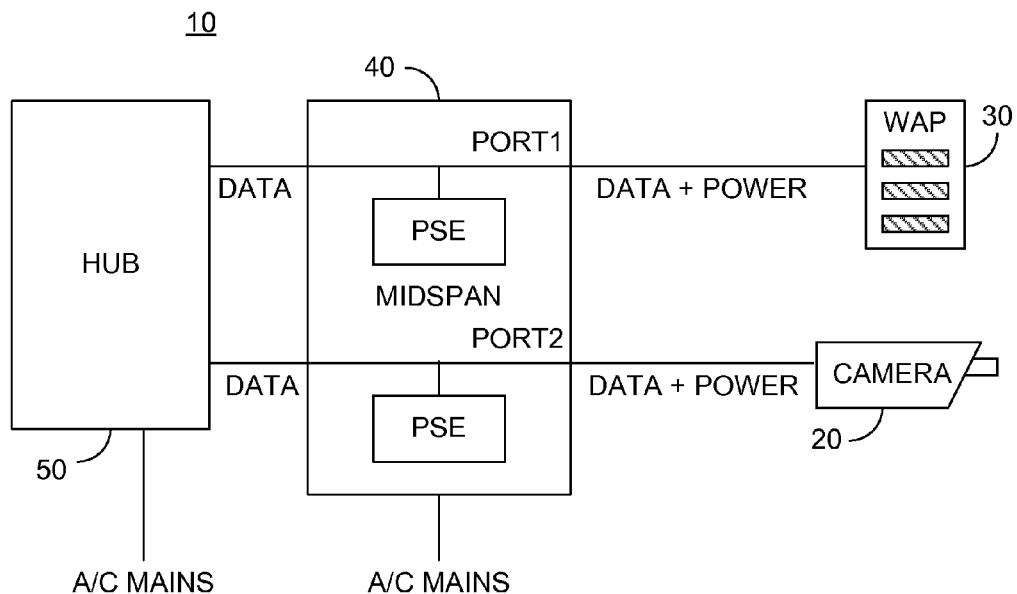
FIG. 1   *PRIOR ART*
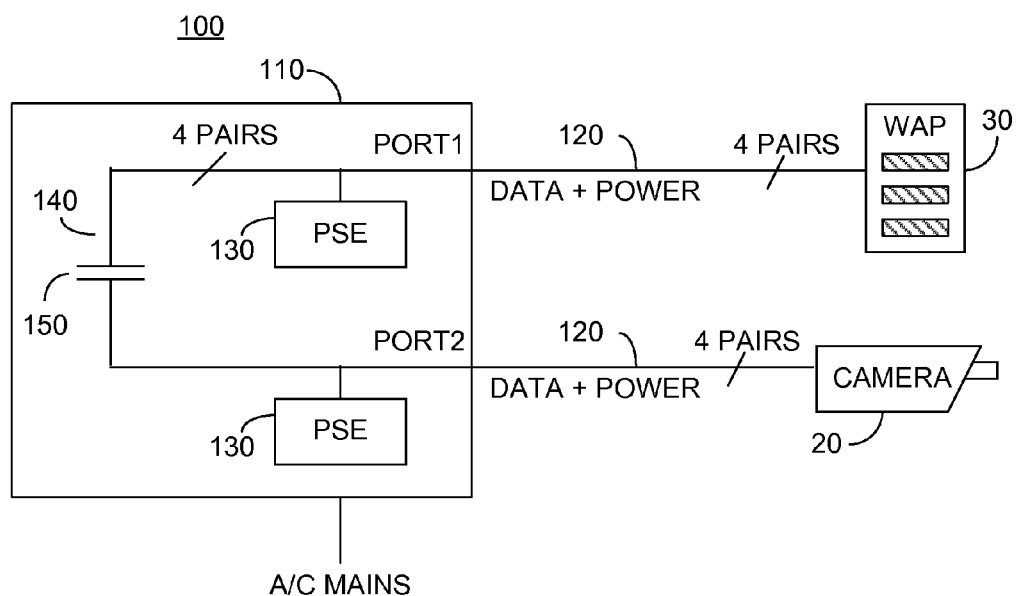
FIG. 2

DUAL PORT PASS-THROUGH MIDSPAN

BACKGROUND OF THE INVENTION

The present invention relates to the field of powering data terminal equipment and more particularly to a dual port pass through midspan having a pass through data connection, wherein a pair of powered devices are connected via the dual port pass through midspan, without requiring hub equipment.

Ethernet communication, also known as IEEE 802.3 data communication, is typically implemented over a structured cable having 4 twisted wire pairs. Power of Ethernet (PoE), as described in IEEE 802.3af—2003 and IEEE 802.3.at—2009, as published by the Institute of Electrical and Electronics Engineers, New York, the entire contents of each document is incorporated herein by reference, is superimposed over the data utilizing phantom powering. In particular, the existing data transformers of Ethernet are center-tapped, with center taps connected to opposing polarity leads of a power sourcing equipment (PSE) and thus the DC current through the two halves of the transformer are of equal magnitude and opposite direction leaving no net flux in the transformer core.

The PSE may be an endpoint PSE, i.e. a PSE associated with the hub equipment, or a midspan PSE, i.e. a PSE arranged between the hub equipment and the PD. The term midspan, as used herein, is meant to include an unit comprising one or more PSE arranged to be installed between DTEs, irrespective as to whether one of the DTEs is a hub or switch equipment, or any other DTE.

Ethernet communication for speeds less than 1000 megabits per second (Mbps) is typically supplied over 2 twisted wire pairs, one of the pairs being used as a transmit pair from the hub equipment to the data terminal equipment (DTE), which when powered by PoE is also known as a powered device (PD), and a second of the pairs being used as a transmit pair from the data terminal equipment to the hub equipment. The other two pairs were typically not used, and are known as spare pairs. In such an embodiment either spare powering, or data pair powering, may be implemented. Ethernet communication for speed of 1000 Mbps and above is typically supply over all 4 twisted wire pairs, with bidirectional communication performed over each of the 4 twisted wire pairs. Powering is typically performed over two twisted wire pairs, analogously to the powering for low speed Ethernet. In certain embodiments, power is provided over all 4 twisted wire pairs.

PoE has enabled remote equipment installation to rapidly expand, since local mains power is not required. PoE is typically delivered at a voltage or around—48 volts, which is typically considered low voltage from a safety perspective. Thus, power and data may be supplied over a single cable, which typically does not require a licensed installer. PoE thus provides ease of installation for remote surveillance cameras, and wireless access points, without limitation.

PoE is further taught in various patents, including U.S. Pat. No. 6,473,608 issued Oct. 29, 2002 to Lehr et al., the entire contents of which is incorporated herein by reference.

FIG. 1 illustrates a high level block diagram of a prior art midspan powering arrangement 10 arranged to provide power and data for a remote surveillance camera 20 and a wireless local area network (LAN) access point 30. Power for both remote surveillance camera 20 and wireless LAN access point 30 is provided by dual port midspan 40, and data communication is provided by hub equipment 50. There is no requirement that hub equipment 50 be provided with a direct wired network connection, although this is typically done, since communication with hub equipment 50 may be provided via wireless LAN access point 30, which may act as a router or switch, without limitation. Such an arrangement provides data communication to a network, remote from the installation, via wireless LAN access point 30, but is quite cumbersome as it requires 4 distinct pieces of equipment and 4 data cables. AC mains power is supplied to each of dual port midspan 40 and hub equipment 50. While AC mains power is illustrated herein, this is not meant to be limiting in any way, and a DC mains may be utilized without exceeding the scope.

It is to be understood that in the event that remote surveillance camera 20 is replace with an additional wireless LAN access point 30, midspan powered arrangement 10 may function as a wireless repeater.

SUMMARY OF THE INVENTION

Accordingly, it is a principal object of the present invention to overcome at least some of the disadvantages of the prior art. This is provided in certain embodiments by providing a dual port pass through midspan having a first port and a second port, and a pair of PSEs. A first PSE is arranged to provide power via a first set of two twisted wire pairs over the first port, and a second PSE is arranged to provide power via a second set of two twisted wire pairs over the second port. A data connection is provided between the first port and the second port within the dual port pass through midspan, so as to enable unencumbered bi-directional data communication between a first DTE connected to the first port and a second DTE connected to the second port.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1 illustrates a high level block diagram of a prior art midspan powering arrangement, and hub based data communication, for a remote surveillance camera and a wireless LAN access point;

FIG. 2 illustrates a high level block diagram of a midspan powering arrangement comprising an exemplary dual port pass through midspan;

DETAILED DESCRIPTION OF PREFERRED EMBODIMENTS

Figure 3:
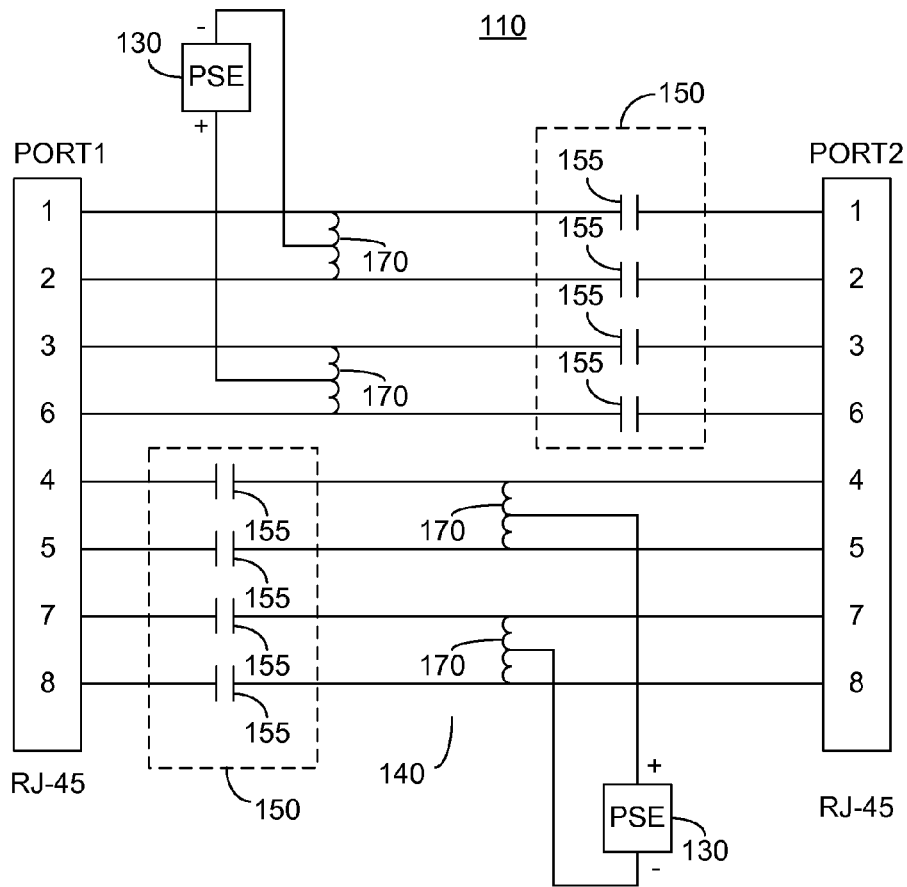
FIG. 3 illustrates a high level schematic diagram of the exemplary dual port pass through midspan of FIG. 2.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term winding is particularly meant to mean a winding of electrically conducting wire forming an inductor. The winding may form a stand alone inductor, or be magnetically coupled to another winding forming a transformer.

FIG. 2 illustrates a high level block diagram of a midspan powering arrangement 100 comprising an exemplary dual port pass through midspan 110, a security camera 20 and a wireless LAN access point 30. Security camera 20 is connected to a first port of dual port pass through midspan 110, denoted PORT1, via a first structured cable 120 comprising 4 twisted wire pairs. Wireless LAN access point 30 is connected to a second port of dual port pass through midspan 110, denoted PORT2, via a second structured cable 120 comprising 4 twisted wire pairs. Each of first and second structured cable 120 carries both power and data in accordance with the teachings of the above reference patent and standards.

Dual port pass through midspan 110 comprises a first and a second PSE 130, and a data pass through connection 140 comprising a direct current blocking circuit 150. Data pass through connection 140 is illustrated as 4 pairs of conductors connecting the 4 pairs of first structured cable 120 via PORT1 to the 4 pairs of second structured cable 120 via PORT2. Direct current blocking circuit 150 is illustrated as a capacitor connected in line with the data pass through connection, and thus isolating DC components appearing at PORT1 from DC components at PORT2. First PSE 130 is connected electrically adjacent PORT1, i.e. between a first end of direct current blocking circuit 150 and PORT1. Second PSE 130 is connected electrically adjacent PORT2, i.e. between a second end of direct current blocking circuit 150 and PORT2. Only a signal A/C mains connection is required to dual port midspan 110 to provide power for first and second PSE 130.

In operation, first PSE 130 injects power onto 2 wire pairs of first structured cable 130 when wireless LAN access point 30 is connected to PORT1 via first structured cable 130. Second PSE 130 injects power onto 2 wire pairs of second structured cable 130 when security camera 20 is connected to PORT2 via second structured cable 130. Data passes freely between wireless LAN access point 30 and security camera 20 responsive to data pass through connection 140. Power injected by first PSE 130 is blocked from appearing at PORT2 by the action of DC blocking circuit 150, and is thus not injected onto second structured cable 120 and not experienced by security camera 20. Power injected by second PSE 130 is blocked from appearing at PORT1 by the action of DC blocking circuit 150, and is thus not injected onto first structured cable 120 and not experienced by wireless LAN access point 30.

Advantageously, dual port midspan 110 may be used as a single port midspan, with one of the ports connected to a powered device, such as security camera 20 or WAP 30, and a second of the ports connected to hub equipment 50, as illustrated in FIG. 1. Second PSE 130 will fail to detect a valid signature resistance on the port connected to hub equipment 50, and thus will not attempt to power the second hub.

FIG. 3 illustrates a high level schematic diagram of an exemplary embodiment of dual port pass through midspan 110 comprising: first and second PSE 130; DC blocking circuit 150 comprising 8 DC blocking capacitors 155; and 4 windings 170. Each of PORT1 and PORT2 are illustrated as being implemented by RJ-45 connector blocks, however this is not meant to be limiting in any way. The pins of each of PORT1 and PORT2, each having 8 pins, are labeled as conventionally utilized in accordance with the above mentioned standards.

Each of pins 1-8 of PORT1 are connected to the respective pin of PORT2 via a conductor having inserted therein a respective DC blocking capacitor 155, the 8 conductors representing 4 pairs of conductors and in total representing data pass through connection 140. A first winding 170 is connected between pins 1 and 2 of PORT1 electrically adjacent PORT1, i.e. a first end of first winding 170 exhibits a DC path to pin 1 of PORT1, and a second end of first winding 170 exhibits a DC path to pin 2 of PORT1. The conductors connecting respective pins 1 and 2 of PORT1 to PORT2 thus represent a first pair of conductors. A second winding 170 is connected between pins 3 and 6 of PORT1 electrically adjacent PORT1, i.e. a first end of second winding 170 exhibits a DC path to pin 3 of PORT1, and a second end of second winding 170 exhibits a DC path to pin 6 of PORT1. The conductors connecting respective pins 3 and 6 of PORT1 to PORT2 thus represent a second pair of conductors.

A third winding 170 is connected between pins 4 and 5 of PORT2 electrically adjacent PORT2, i.e. a first end of third winding 170 exhibits a DC path to pin 4 of PORT2, and a second end of third winding 170 exhibits a DC path to pin 5 of PORT2. The conductors connecting respective pins 4 and 5 of PORT1 to PORT2 thus represent a third pair of conductors. A fourth winding 170 is connected between pins 7 and 8 of PORT2 electrically adjacent PORT2, i.e. a first end of fourth winding 170 exhibits a DC path to pin 7 of PORT2, and a second end of fourth winding 170 exhibits a DC path to pin 8 of PORT2. The conductors connecting respective pins 7 and 8 of PORT1 to PORT2 thus represent a fourth pair of conductors.

An output of first PSE 130, denoted +, is connected to a center tap connection of second winding 170; and a return of first PSE 130, denoted −, is connected to a center tap connection of first winding 170. The polarity indicated is preferred, however is not required, since PD's are typically arranged to be polarity insensitive.

An output of second PSE 130, denoted +, is connected to a center tap connection of third winding 170; and a return of second PSE 130, denoted −, is connected to a center tap connection of fourth winding 170. The polarity indicated is preferred, however is not required, since PD's are typically arranged to be polarity insensitive.

In operation, first PSE 130 detects a PD connected to PORT1 via first structured cable 120, and if detected, injects power to the PD connected to PORT1 via first and second windings 170 to the 2 wire pairs of first structured cable 120 connected to pins 1, 2, 3 and 6 of PORT1. Power injected via first PSE 130 is prevented from appearing at PORT2 by the action of the various in line DC blocking capacitors 155. Data appearing at pins 1, 2, 3 and 6 of either PORT1 or PORT2 are reflected across the data pass through connection 140.

Second PSE 130 detects a PD connected to PORT2 via second structured cable 120, and if detected, injects power to the PD connected to PORT2 via second and third windings 170 to the 2 wire pairs of second structured cable 120 connected to pins 4, 5, 7 and 8 of PORT2. Power injected via second PSE 130 is prevented from appearing at PORT1 by the action of the various in line DC blocking capacitors 155. Data appearing at pins 4, 5, 7 and 8 of either PORT1 or PORT2 are reflected across the data pass through connection 140.

The above has been illustrated in an embodiment wherein first PSE 130 and second PSE 130 each inject power onto separate sets of 2 wire pairs, however this is not meant to be limiting in any way. In another embodiment, first PSE and second PSE 130 each inject power onto the same sets of 2 wire pairs, on either side of DC blocking circuit 150. Preferably in such an embodiment first and second PSE 130 are isolated from each other to avoid the creation of a DC path around DC blocking circuit 150. It is to be understood that while the above has been illustrated with first PSE 130 providing power on a single set of 2 wire pairs, an additional PSE may be supplied to provide power on the second set of 2 wire pairs towards PORT1, and/or a second additional PSE may be supplied to provide power on the second set of 2 wire pairs towards PORT2, in a manner taught in U.S. Pat. No. 7,460,889 issued Dec. 2, 2008 to Darshan et al., the entire contents of which is incorporated herein by reference, without exceeding the scope.

Figure 4:
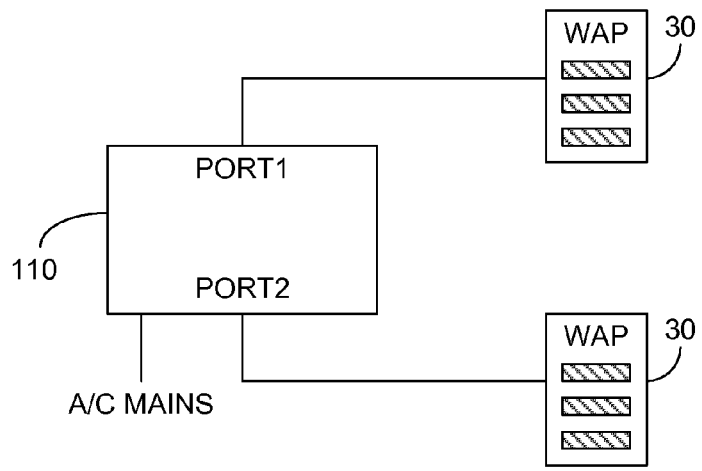
FIG. 4 illustrates a high level block of a midspan powering arrangement comprising an exemplary dual port pass through midspan, wherein each port of the dual port pass through midspan has connected thereto a wireless LAN access point.

FIG. 4 illustrates a high level block of a midspan powering arrangement comprising an exemplary dual port pass through midspan 110, wherein PORT1 is connected to wireless LAN access point 30 and PORT2 is connected to an additional wireless LAN access point 30. Such an arrangement may provide for a repeater arrangement for a wireless LAN, wherein the additional wireless LAN access point 30 provides communication access for areas which can not receive the signal received by wireless LAN access point 30.

Figure 5:
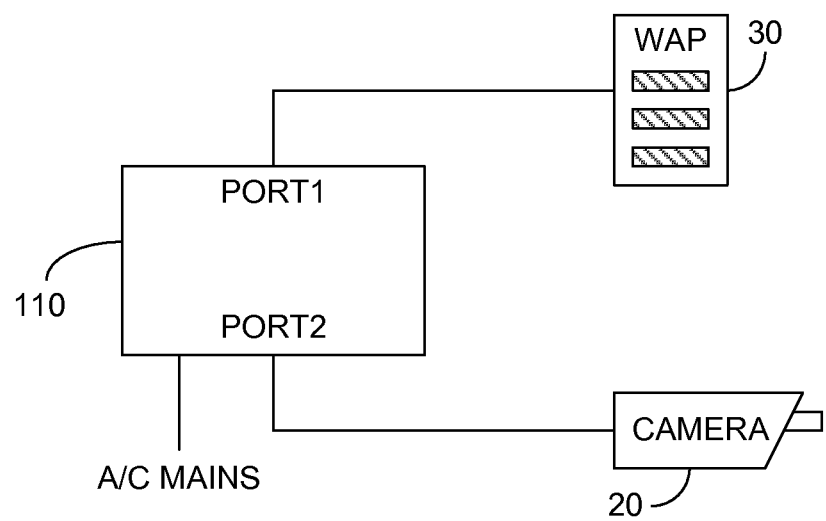
FIG. 5 illustrates a high level block of a midspan powering arrangement comprising an exemplary dual port pass through midspan, wherein one port of the dual port pass through midspan has connected thereto a wireless LAN access point and the second port of the dual port pass through midspan has connected thereto a security camera.

FIG. 5 illustrates a high level block of a midspan powering arrangement comprising an exemplary dual port pass through midspan 110, wherein PORT1 is connected to wireless LAN access point 30 and PORT2 is connected to security camera 20. Such an arrangement provides for wireless access to security camera 20 even in the absence of a direct wired connection thereto. Thus, security camera 20 may be installed in a location requiring only a single AC mains connection for dual port pass through midspan 110, with wireless LAN access point 20 transmitting any images received by security camera 20 to a remote location.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

The invention claimed is:

1. A dual port pass through midspan comprising:
   a first port arranged for connection to a first data terminal equipment over a first data communication cabling comprising 4 wire pairs, said first data terminal equipment arranged to communicate bi-directionally over each pair of said 4 wire pairs of said first data communication cabling;
   a second port arranged for connection to a second data terminal equipment over a second data communication cabling comprising 4 wire pairs, said second data terminal equipment arranged to communicate bi-directionally over each pair of said 4 wire pairs of said second data communication cabling, said first and second terminal data equipment thereby arranged for a communication speed with each other of at least 1000 megabits per second;
   a first power sourcing equipment in communication with said first port, said first power sourcing equipment arranged to inject power on two of the 4 wire pairs of the first data communication cabling when the first data terminal equipment is connected to said first port by the first data communication cabling;
   a second power sourcing equipment in communication with said second port, said second power sourcing equipment arranged to inject power on two of the 4 wire pairs of the second data communication cabling when the second data terminal equipment is connected to said second port by the second data communication cabling; and
   a passive data pass through connection arranged to pass high speed data signals between said first port to said second port, said passive data pass through connection comprising a direct current blocking circuit arranged to:
   prevent power from said first power sourcing equipment from appearing at said second port; and
   prevent power from said second power sourcing equipment from appearing at said first port,
   wherein said passive data pass through connection comprises 4 pairs of conductors and 8 blocking capacitors, each pair of said conductors arranged to connect a particular one of the 4 wire pairs of the first data communication cabling to a particular one of the 4 wire pairs of the second data communication cabling, wherein each conductor of said 4 pairs of conductors has a particular one of said 8 blocking capacitors connected in line thereof, thereby preventing said power from said first power sourcing equipment from appearing at said second port and preventing said power from said second power sourcing equipment from appearing at said first port.

2. The dual port pass through midspan according to claim 1, further comprising 4 windings, each of said 4 windings arranged between a first wire and a second wire of a respective pair of said conductors,
   a first and a second of said windings coupled to the respective pairs of conductors electrically adjacent said first port and isolated from said second port by the respective blocking capacitors,
   a third and a fourth of said windings coupled to the respective pairs of conductors electrically adjacent said second port and isolated from said first port by the respective blocking capacitors,
   a power output of said first power sourcing equipment coupled to a center tap of a first of said 4 windings,
   a return of said first power sourcing equipment coupled to a center tap of a second of said 4 windings,
   a power output of said second power sourcing equipment coupled to a center tap of a third of said 4 windings, and
   a return of said second power sourcing equipment coupled to a center tap of a fourth of said 4 windings.

3. The dual port pass through midspan according to claim 1, wherein said first port comprises an RJ-45 jack having 8 terminals, and said second port comprises an RJ-45 jack having 8 connectors, wherein said first power sourcing equipment is arranged to inject power onto terminals 1, 2, 3 and 6 of said first port when the first data terminal equipment is connected to said first port by the first data communication cabling, and said second power sourcing equipment is arrange to inject power onto terminals 4, 5, 7 and 8 of said second port when the second data terminal equipment is connected to said second port by the second data communication cabling.

4. A system comprising a plurality of data terminals equipment receiving power from a dual port pass through midspan and not requiring hub equipment, said system comprising:
   a dual port pass through midspan comprising a first port and a second port;
   a first data terminal equipment arranged for connection to said first port over a first data communication cabling comprising 4 wire pairs, said first data terminal equipment further arranged to communicate bi-directionally over each pair of said 4 wire pairs of said first data communication cabling; and
   a second data terminal equipment arranged for connection to said second port over a second data communication cabling comprising 4 wire pairs, said second data terminal equipment further arranged to communicate bi-directionally over each pair of said 4 wire pairs of said second data communication cabling, said first and second terminal data equipment thereby arranged for a communication speed with each other of at least 1000 megabits per second,
   said dual port pass through midspan comprising:
      a first power sourcing equipment in communication with said first port, said first power sourcing equipment arranged to inject power on two of the 4 wire pairs of the first data communication cabling when said first data terminal equipment is connected to said first port by the first data communication cabling;
      a second power sourcing equipment in communication with said second port, said second power sourcing equipment arranged to inject power on two of the 4 wire pairs of the second data communication cabling when said second data terminal equipment is connected to said second port by the second data communication cabling; and
      a passive data pass through connection arranged to pass high speed data signals between said first port to said second port, said data pass through connection comprising a direct current blocking circuit arranged to:
         prevent power from said first power sourcing equipment from appearing at said second port; and
         prevent power from said second power sourcing equipment from appearing at said first port,
      wherein said passive data pass through connection of said dual port pass through midspan comprises 4 pairs of conductors and 8 blocking capacitors, each pair of said conductors arranged to connect a particular one of the 4 wire pairs of the first data communication cabling to a particular one of the 4 wire pairs of the second data communication cabling, wherein each conductor of said 4 pairs of conductors has a particular one of said 8 blocking capacitors connected in line thereof, thereby preventing said power from said first power sourcing equipment from appearing at said second port and preventing said power from said second power sourcing equipment from appearing at said first port.

5. The system according to claim 4, wherein said dual port pass through midspan further comprises 4 windings, each of said 4 windings arranged between a first wire and a second wire of a respective pair of said conductors,
   a first and a second of said windings coupled to the respective pairs of conductors electrically adjacent said first port and isolated from said second port by the respective blocking capacitors,
   a third and a fourth of said windings coupled to the respective pairs of conductors electrically adjacent said second port and isolated from said first port by the respective blocking capacitors,
   a power output of said first power sourcing equipment coupled to a center tap of a first of said 4 windings,
   a return of said first power sourcing equipment coupled to a center tap of a second of said 4 windings,
   a power output of said second power sourcing equipment coupled to a center tap of a third of said 4 windings, and
   a return of said second power sourcing equipment coupled to a center tap of a fourth of said 4 windings.

6. The system according to claim 4, wherein said first port of said dual port pass through midspan comprises an RJ-45 jack having 8 terminals, and said second port of said dual port pass through midspan comprises an RJ-45 jack having 8 connectors, wherein said first power sourcing equipment of said dual port pass through midspan is arranged to inject power onto terminals 1, 2, 3 and 6 of said first port when said first data terminal equipment is connected to said first port by the first data communication cabling, and said second power sourcing equipment of said dual port pass through midspan is arranged to inject power onto terminals 4, 5, 7 and 8 of said second port when said second data terminal equipment is connected to said second port by the second data communication cabling.

7. The system of claim 4, wherein said first data terminal equipment is a wireless local area network adapter.

8. The system of claim 7, wherein said second data terminal equipment is a security camera.

9. The system of claim 7, wherein said second data terminal equipment is an additional wireless local area network adapter.

10. A method of providing power and data communication for a plurality of data terminal equipments not requiring hub equipment, said method comprising:
- providing a first data terminal equipment;
- providing a second data terminal equipment;
- providing a pass through midspan having a first port and a second port;
- connecting said first data terminal equipment over a first data communication cabling comprising 4 wire pairs to said first port of said provided pass through midspan, said provided first data terminal equipment arranged to communicate bi-directionally over each pair of the 4 wire pairs of the first data communication cabling;
- connecting said second data terminal equipment over a second data communication cabling comprising 4 wire pairs to said second port of said provided pass through midspan, said provided second data terminal equipment arranged to communicate bi-directionally over each pair of the 4 wire pairs of the second data communication cabling;
- said provided pass through midspan comprising a first power sourcing equipment, said first power sourcing equipment injecting power onto two of the 4 wire pairs of the first data communication cabling when said provided first data terminal equipment is connected to said first port by the first data communication cabling;
- said provided pass through midspan further comprising a second power sourcing equipment, said second power sourcing equipment injecting power onto two of the 4 wire pairs of the second data communication cabling when said second data terminal equipment is connected to said second port by the second data communication cabling;
- passively passing high speed data signals between said first port to said second port with a communication speed of at least 1000 megabits per second;
- preventing power from said first power sourcing equipment from appearing at said second port; and
- preventing power from said second power sourcing equipment from appearing at said first port, wherein said passing of high speed data signals is performed by a data pass through connection of said provided pass through midspan, said data pass through connection comprising 4 pairs of conductors and 8 blocking capacitors, each pair of said conductors arranged to connect a particular one of the 4 wire pairs of the first data communication cabling to a particular one of the 4 wire pairs of the second data communication cabling, wherein each conductor of said 4 pairs of conductors has a particular one of said 8 blocking capacitors connected in line thereof, thereby preventing said power from said first power sourcing equipment from appearing at said second port and preventing said power from said second power sourcing equipment from appearing at said first port.

11. The method according to claim 10, wherein said provided pass through midspan further comprises 4 windings, each of said 4 windings arranged between a first wire and a second wire of a respective pair of said conductors,
- a first and a second of said windings coupled to the respective pairs of conductors electrically adjacent said first port and isolated from said second port by the respective blocking capacitors,
- a third and a fourth of said windings coupled to the respective pairs of conductors electrically adjacent said second port and isolated from said first port by the respective blocking capacitors,
- a power output of said first power sourcing equipment coupled to a center tap of a first of said 4 windings thereby injecting said power onto two of the 4 wire pairs of the first data communication cabling,
- a return of said first power sourcing equipment coupled to a center tap of a second of said 4 windings thereby providing a return for said injected power onto two of the 4 wire pairs of the first data communication cabling,
- a power output of said second power sourcing equipment coupled to a center tap of a third of said 4 windings thereby injecting said power onto two of the 4 wire pairs of the second data communication cabling, and
- a return of said second power sourcing equipment coupled to a center tap of a fourth of said 4 windings thereby providing a return for said injected power onto two of the 4 wire pairs of the second data communication cabling.

12. The method according to claim 10, wherein said first port of said provided pass through midspan comprises an RJ-45 jack having 8 terminals, and said second port of said provided pass through midspan comprises an RJ-45 jack having 8 connectors, wherein said injecting of said first power sourcing equipment onto terminals 1, 2, 3 and 6 of said first port, and said injecting of said second power sourcing equipment is onto terminals 4, 5, 7 and 8 of said second port.

13. The method of claim 10, wherein said first data terminal equipment is a wireless local area network adapter.

14. The method of claim 13, wherein said second data terminal equipment is a security camera.

15. The method of claim 13, wherein said second data terminal equipment is an additional wireless local area network adapter.

\* \* \* \* \*